US006803009B2

(12) United States Patent
Morman et al.

(10) Patent No.: US 6,803,009 B2
(45) Date of Patent: Oct. 12, 2004

(54) PROCESS FOR MAKING NECKED NONWOVEN WEBS AND LAMINATES HAVING CROSS-DIRECTIONAL UNIFORMITY

(75) Inventors: Michael T. Morman, Alpharetta, GA (US); Sjon-Paul L. Conyer, Westmoreland, TN (US); Randall J. Palmer, Acworth, GA (US); Charles J. Morell, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 248 days.

(21) Appl. No.: 09/995,962

(22) Filed: Nov. 28, 2001

(65) Prior Publication Data

US 2003/0100237 A1 May 29, 2003

(51) Int. Cl.$^7$ ............................. D04H 3/00; D06C 3/06
(52) U.S. Cl. ..................................... 264/288.4
(58) Field of Search ....................... 264/288.4

(56) References Cited

U.S. PATENT DOCUMENTS

| | | |
|---|---|---|
| 3,692,618 A | 9/1972 | Dorschner et al. |
| 3,849,241 A | 11/1974 | Butin et al. |
| 3,949,127 A | 4/1976 | Ostermeier et al. |
| 4,016,319 A | 4/1977 | Marshall |
| 4,295,251 A | 10/1981 | Tatham et al. |
| 4,340,563 A | 7/1982 | Appel et al. |
| 4,443,513 A | 4/1984 | Meitner et al. |
| 4,663,220 A | 5/1987 | Wisneski et al. |
| 4,720,415 A | 1/1988 | Vander Wielen et al. |
| 4,741,949 A | 5/1988 | Morman et al. |
| 4,762,520 A | 8/1988 | Wallström |
| 4,789,699 A | 12/1988 | Kieffer et al. |
| 4,965,122 A | 10/1990 | Morman |
| 4,981,747 A | 1/1991 | Morman |
| 5,028,289 A | 7/1991 | Rasmussem |
| 5,116,662 A | 5/1992 | Morman |
| 5,156,793 A | 10/1992 | Buell et al. |
| 5,336,545 A | 8/1994 | Morman |
| 5,366,793 A | 11/1994 | Fitts, Jr. et al. |
| 5,456,971 A | 10/1995 | Fahmy |
| 5,492,753 A | 2/1996 | Levy et al. |
| 5,514,470 A | 5/1996 | Haffner et al. |
| 5,560,793 A | 10/1996 | Ruscher et al. |
| 5,622,772 A | 4/1997 | Stokes et al. |
| 5,707,468 A | 1/1998 | Arnold et al. |

(List continued on next page.)

FOREIGN PATENT DOCUMENTS

| | | |
|---|---|---|
| EP | 0 396 800 A1 | 11/1990 |
| EP | 602 613 A1 | 6/1994 |
| GB | 2 114 174 A | 8/1983 |

(List continued on next page.)

OTHER PUBLICATIONS

Abstract of JP 09285488 A, published Nov. 4, 1997.

*Primary Examiner*—Leo B. Tentoni
(74) *Attorney, Agent, or Firm*—Pauley Petersen & Erickson

(57) ABSTRACT

A process for making a necked nonwoven web having improved cross directional uniformity includes the steps of passing a nonwoven web between a first nip having a first surface velocity and a second nip having a second surface velocity, necking the nonwoven web between the first and second nips, and selectively increasing the necking of a central region of the nonwoven web relative to two edge regions or selectively decreasing the necking in the edge regions. The selective increase in necking in the central region or selective decrease in necking in the edge regions offsets the relatively higher necking in the edge regions which is inherent in conventional necking processes. A process for making a laminate having improved cross-directional uniformity is also provided.

62 Claims, 5 Drawing Sheets

U.S. PATENT DOCUMENTS

| | | |
|---|---|---|
| 5,755,902 A | 5/1998 | Reynolds |
| 5,789,065 A | 8/1998 | Haffner et al. |
| 5,807,292 A | 9/1998 | Delmore |
| 5,883,028 A | 3/1999 | Morman et al. |
| 6,001,460 A | 12/1999 | Morman et al. |
| 6,028,240 A | 2/2000 | Wessel et al. |
| 6,069,097 A | 5/2000 | Suzuki et al. |
| 6,255,236 B1 | 7/2001 | Cree et al. |

FOREIGN PATENT DOCUMENTS

| | | |
|---|---|---|
| WO | 92/16371 A1 | 10/1992 |
| WO | 99/37841 A | 7/1999 |
| WO | 99/37841 A1 | 7/1999 |
| WO | 00/16974 A2 | 3/2000 |
| WO | 00/29199 A1 | 5/2000 |
| WO | 01/00915 A1 | 1/2001 |
| WO | 01/12427 A1 | 2/2001 |
| WO | 01/30563 A1 | 5/2001 |

PROCESS FOR MAKING NECKED NONWOVEN WEBS AND LAMINATES HAVING CROSS-DIRECTIONAL UNIFORMITY

FIELD OF THE INVENTION

This invention relates to a process for making necked nonwoven webs and laminates having more uniform basis weights and stretching properties, and to necked nonwoven webs and laminates so made.

BACKGROUND OF THE INVENTION

Necked nonwoven webs, including necked spunbond webs, meltblown webs, combinations and the like, are often made using a process which is schematically illustrated in FIG. 1. A nonwoven web 12 having a starting width A is passed in its machine direction between a first nip 16, which can be a first pair of nip rollers traveling at a first surface velocity, and a second nip 26, which can be a second pair of nip rollers traveling at a second surface velocity which is faster than the first surface velocity. The surface velocity difference between the first and second nips results in formation of a narrower ("necked") nonwoven web 22 having a necked width A' which is less than the starting width A.

The necked nonwoven web 22 generally includes fibers which are closer together and more aligned in the machine direction than the fibers of the starting nonwoven web 12, which can be more randomly aligned. The necking may be performed with the aid of heat applied below the melting temperature of the fibers, for instance, by placing an oven or other heat source between the first and second nips. The necked nonwoven web 22 may also be heat set, either during or after the necking process, so that the necked web becomes somewhat stable. A nonwoven web which is stable in the necked condition is said to be "reversibly necked". A reversibly necked nonwoven web can be easily extended in the cross direction by applying a small extension force, and tends to return to its narrower, necked configuration when the extension force is released.

The starting nonwoven web 12 includes edge regions 13 and 15, and a central region 11. The necked nonwoven web 22 includes edge regions 23 and 25, and a central region 21. Because the necking causes the nonwoven fibers to become closer together and more aligned, without noticeably stretching or narrowing the individual fibers, the necked nonwoven web 22 generally has a higher basis weight than the starting nonwoven web 12.

As can be easily seen from FIG. 1, the nonwoven fibers in the edge regions 13 and 15 of the starting nonwoven web travel a greater distance between the first nip 16 and the second nip 26 of the necking process, than the fibers in the central region 11. Furthermore, the cross-directional stresses in the central region 11 are at least partially counteracted, because these stresses are applied in both cross directions. The cross-directional stresses in each of the edge regions 13 and 15 are primarily in one direction, inward toward the center of the web. This results in increased fiber gathering and necking in the edge regions. Consequently, the fibers in the edge regions 23 and 25 of the necked nonwoven web are generally more aligned and closer together than the fibers in the central region 21. As a result, the necked nonwoven web may be nonuniform in the cross direction, having a higher basis weight in both edge regions than in the central region, and having greater cross-directional extendibility in both edge regions than the central region.

There is a need desire for a necking process which produces necked nonwoven webs having better cross-directional uniformity. There is also a need or desire for necked nonwoven webs, and laminates containing necked nonwoven webs, which have better cross-directional uniformity.

DEFINITIONS

As used herein, the term "recover" refers to a contraction of a stretched material upon termination of a biasing force following stretching length of the material by application of the biasing force. For example, if a necked material having a relaxed, unbiased width of one (1) inch is elongated 50 percent in the cross direction by stretching to a width of one and one half (1.5) inches the material would be elongated 50 percent (0.5 inch) and would have a stretched width that is 150 percent of its relaxed width. If this exemplary stretched material is relaxed, and is recovered to a width of one and one tenth (1.1) inches after release of the biasing and stretching force, the material would have recovered 80 percent (0.4 inch) of its one-half (0.5) inch elongation. Recovery may be expressed as [(maximum stretched dimension minus final sample dimension)/(maximum stretched dimension minus initial sample dimension)]×100.

As used herein, the term "nonwoven web" means a web that has a structure of individual fibers of threads which are interlaid, but not in an identifiable repeating manner. Nonwoven webs have been, in the past, formed by a variety of processes such as, for example, meltblowing processes and bonded carded web processes.

As used herein the term "microfibers" means small diameter fibers having an average diameter not greater than about 100 microns, for example, having a diameter of from about 0.5 microns, more specifically microfibers may also have an average diameter of from of from about 4 microns to about 40 microns.

As used in herein, the term "interfiber bonding" means bonding produced by thermal bonding or entanglement between the individual nonwoven fibers to form a coherent web structure. Fiber entangling is inherent in the meltblown processes but may be generated or increased by processes such as, for example, hydraulic entangling or needle punching. One or more thermal bonding steps are employed in most processes for forming spunbond webs. Alternatively and/or additionally, a bonding agent can be utilized to increase the desired bonding and to maintain structural coherency of the web. For example, powdered bonding agents and chemical solvent bonding may be used.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameters, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, the disclosure of which is hereby incorporated by reference.

As used herein, the term "spunbonded fibers" refers to small diameter fibers which are formed by extruding a molten thermoplastic material as filaments from plurality of fine, usually circular, capillaries in a spinnerette with the diameter of the extruded filaments then being rapidly reduced, for example, by eductive drawing or other well-known spun bonding mechanisms. The production of spunbonded nonwoven webs is illustrated in patents such as, for example, in U.S. Pat. No. 4,340,563 to Appel et al., and U.S. Pat. No. 3,692,618 to Dorschner et al. The disclosures of both these patents are hereby incorporated by reference.

As used herein, the term "necked material" refers to any material which has been constricted in at least one dimension by processes such as, for example, drawing or gathering.

As used herein, the term "neckable material" means any material which can be necked.

As used herein, the "central region" of a nonwoven web is defined as the central 70% of the cross-directional width of the nonwoven web. The "edge regions" are defined as the outermost 15% of the width on both sides of the central region of the nonwoven web.

As used herein, the term "reversibly necked material" refers to a necked material that has been treated while necked to impart memory to the material so that, when a force is applied to extend the material to its pre-necked dimensions, the necked and treated portions will generally recover to their necked dimensions upon termination of the force. One form of treatment is the application of heat. Generally speaking, extension of the reversibly necked material is substantially limited to extension to its pre-necked dimensions. Therefore, unless the material is elastic, extension too far beyond its pre-necked dimensions will result in material failure. A reversibly necked material may include more than one layer, for example, multiple layers of spunbonded web, multiple layers of meltblown web, multiple layers of bonded carded web or any other suitable combination or mixtures thereof, as described in U.S. Pat. No. 4,965,122, which is incorporated by reference.

As used herein, the term "percent neckdown" refers to the ratio determined by measuring the difference between the pre-necked dimension (width) and the necked dimension (width) of a neckable material and then dividing that difference by the pre-necked dimension of the neckable material.

As used therein, the term "percent stretch" refers to the ratio determined by measuring the increase in the stretched dimension (in any direction) and dividing that value by the original dimension (in the same direction), i.e., (increase in stretched dimension/original dimension)×100.

As used herein, the term "composite elastic necked bonded material" refers to a material having an elastic sheet joined to a necked material at least at two places. The elastic sheet may be joined to the necked material at intermittent points or may be completely bonded thereto. The joining is accomplished while the elastic sheet and the necked material are in juxtaposed configuration. The composite elastic necked-bonded material is elastic in a direction generally parallel to the direction of neckdown of the necked material and may be stretched in that direction to the breaking point of the necked material. A composite elastic necked-bonded material may include more than two layers. For example, the elastic sheet may have necked material joined to both of its sides so that a three-layer composite elastic necked-bonded material is formed having a structure of necked material/elastic sheet/necked material. Additional elastic sheets, necked material layers, and/or inherently extendible materials such as bonded carded webs may be added. Other combinations of elastic sheets and necked materials may be used, for instance, as indicated in U.S. Pat. No. 5,336,545, which is incorporated by reference.

As used herein, the term "polymer" generally includes, but is not limited to homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "selectively" encompasses the terms "only" and "to a greater extent".

As used herein, the term "consisting essentially of" does not exclude the presence of additional materials or process steps which do not significantly affect the desired characteristics of a given composition or product. Exemplary materials of this sort would include, without limitation, pigments, antioxidants, stabilizers, surfactants, waxes, flow promoters, solvents, particulates and materials added to enhance processability of the composition.

As used herein, the term "comprising" opens the claim to inclusion of additional materials and/or process steps other than those recited.

SUMMARY OF THE INVENTION

The present invention is directed to a process for making a necked nonwoven web having better cross-directional uniformity, and to necked nonwoven webs and laminates so made. As with the conventional process illustrated in FIG. 1, the process of the invention includes the steps of passing a nonwoven web through a first nip having a first average surface velocity, and a second nip having a second average surface velocity which is higher than the first average surface velocity, and necking the nonwoven web between the nips. The second average surface velocity is about 1.05–1.7 times the first average surface velocity, suitably about 1.1–1.5 times the first average surface velocity desirably about 1.2–1.4 times the first average velocity.

As explained above, the conventional necking process inherently necks the edge regions of the nonwoven web to a greater extent than the central region. Therefore, to achieve a more uniform necking profile, the process of the invention further includes the step of varying the necking in the central region relative to the two edge regions. The varying may involve increasing the necking in the central region of the nonwoven web relative to the edge regions, and/or decreasing the necking of the edge regions relative to the central region. This is accomplished by reducing the necking resistance of the central region relative to the edge regions, increasing the necking resistance of the edge regions, increasing the necking force applied to the central region, and/or reducing the necking force applied to the edge regions.

In one embodiment of this invention, the necking resistance of the central region of the nonwoven web relative to the edge regions is reduced by selectively heating the central region. The selective heating can be accomplished either by a) heating the central region only, and not the end regions, or b) heating the entire nonwoven web, but heating the central region to a higher temperature and/or over a longer distance than the end regions. The selective heating should not be so great as to melt any of the nonwoven fibers. The selective heating reduces necking resistance in the central region (effectively increasing the necking in that region) by rendering the nonwoven fibers in the central region softer and more pliable than the nonwoven fibers in the two end regions. Alternatively, the edge regions may be selectively chilled, to increase the necking resistance in the edge regions relative to the central region.

In another embodiment of the invention, the necking force applied to the central region of the nonwoven web is selectively increased by increasing the distance that the central region travels between the first and second nips, relative to the distance traveled by the two edge regions. This can be accomplished by passing the nonwoven web around a profiled guide roller located between the first and second nips in the necking process. The profiled guide roller has a central portion and two end portions. The central portion has a larger diameter than the two end portions. Each turn of the profiled guide roller pulls the central region of the nonwoven web more than the edge regions. The central region of the nonwoven web, which passes over the central portion of the guide roller, experiences a corresponding increase in distance traveled and necking force relative to the two edge regions. The resulting necked nonwoven web has more uniform basis weight and cross-directional extendibility across its width. The necked nonwoven web may be heat set to preserve the necking.

DETAILED DESCRIPTION OF THE PRESENTLY PREFERRED EMBODIMENTS

Figure 1:
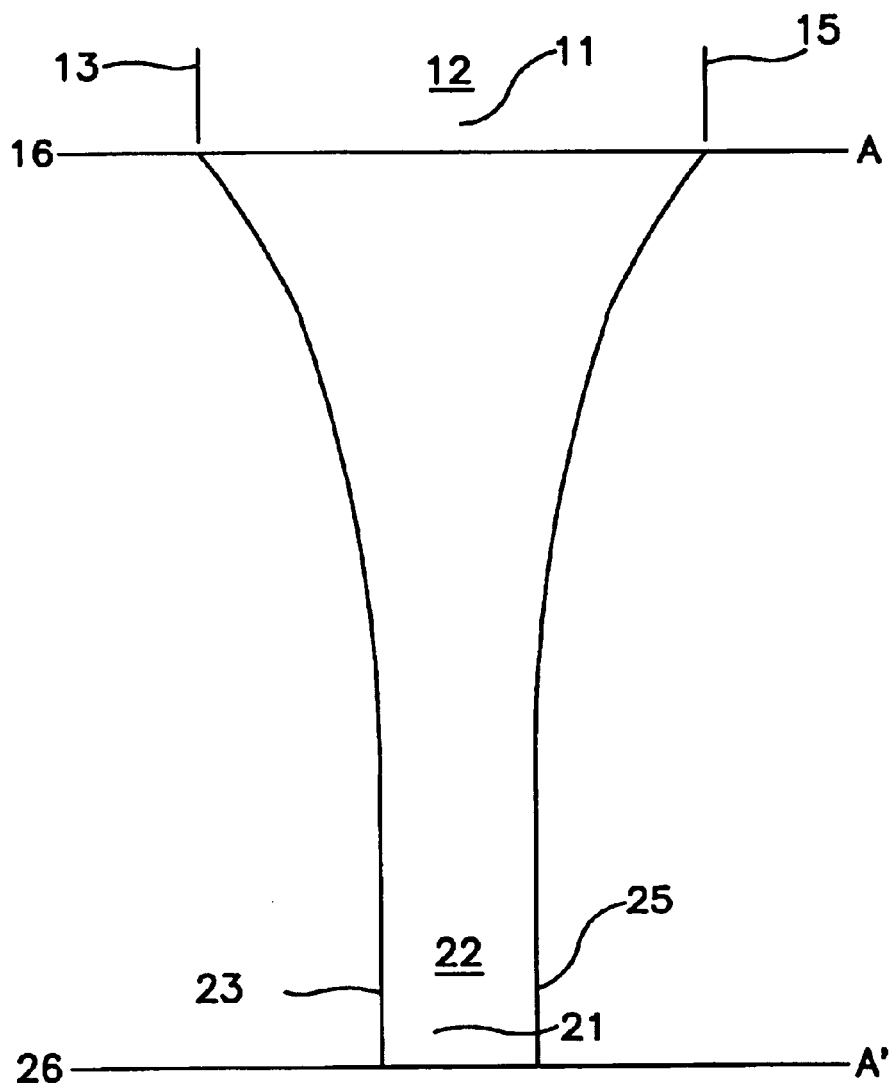
FIG. 1 schematically illustrates a conventional necking process, as described in the foregoing "Background of the Invention".
Figure 2:
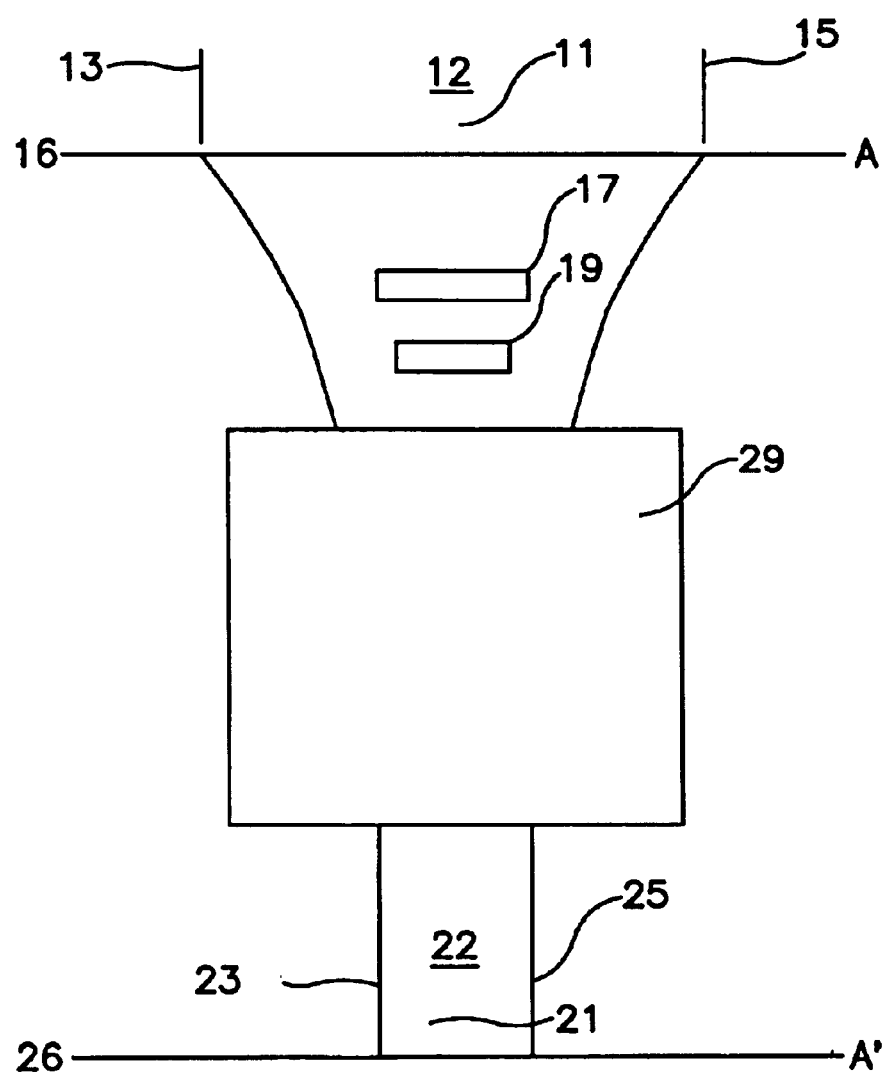
FIG. 2 schematically illustrates a necking process of the invention, in which the central region of the nonwoven web is selectively heated.

FIG. 2 illustrates one embodiment a necking process which can be used to selectively increase the necking of the central region 11 of the nonwoven web 12, relative to the two edge regions 13 and 15. The necking process of FIG. 2 resembles the prior art necking process of FIG. 1, described above, except for the additional inclusion of heating apparatus 17, 19 and 29.

Heating apparatus 29 can be a conventional open-ended forced air oven, through which the entire nonwoven web 12 may pass between the first nip 16 and the second nip 26. The oven 29 can be used to aid in necking and heat setting the entire nonwoven web, resulting in a necked nonwoven web 22 which is reversibly necked. The temperature inside the oven 29 should be high enough to soften the nonwoven fibers and increase their pliability, but not so high as to either a) melt the fibers, or b) soften the fibers to such an extent that the necking process causes significant stretching, narrowing and/or breaking of individual nonwoven fibers. When the nonwoven fibers are made from a polyolefin, for instance, the highest temperature reached by the nonwoven web inside the oven should be at least about 20° C. below the melting temperature of the fibers, suitably at least about 25° C. below the melting temperature of the fibers, desirably at least about 30° C. below the melting temperature of the fibers. Optimal necking temperatures are typically about 30–60° C. below the melting temperature of the fibers. When the nonwoven web is a spunbond polypropylene web, for instance, a desired necking temperature is about 105–140° C.

In accordance with the invention, heating devices 17 and 19, affecting only the central region 11 of the nonwoven web, are placed upstream from the oven 29, between the oven 29 and first nip 16. Heating devices 17 and 19 have a width that is significantly less than the width of the nonwoven web at that location, thereby ensuring that only the central region 11 is affected by these heating devices. Heating devices 17 and 19 may be hot air knives as described, for example, in U.S. Pat. No. 5,707,468 to Arnold et al., which is incorporated by reference. In a hot air knife assembly, one or more high velocity jets of hot air are applied to the surface of a nonwoven web through a device which includes an upper plenum and a lower slot or slots facing the moving nonwoven web.

The heating apparatus 17, 19 and 29 may be applied to the moving nonwoven web in a variety of ways. In one embodiment, the oven 29 may be "off" and one or both heating devices 17 and 19 may be "on," so that only the central region of the nonwoven web is heated. In another embodiment, the oven 29 may be set at a first heating temperature, and heating devices 17 and/or 19 may be set to a second, higher temperature, so that the central region of the nonwoven web is effectively heated to a higher temperature than the two edge regions. In still another embodiment, the oven 29, and heating devices 17 and/or 19, may be set to the same heating temperature so that the central region 11 of the nonwoven web is heated to about the same temperature, but for a longer period of time and over a greater longitudinal distance, than the two edge regions. Additionally, the heating devices 17 and/or 19 may be designed or set to apply a higher hot air flow to the central region 11, than the oven applies to the edge regions 13 and 15.

Figure 3A:
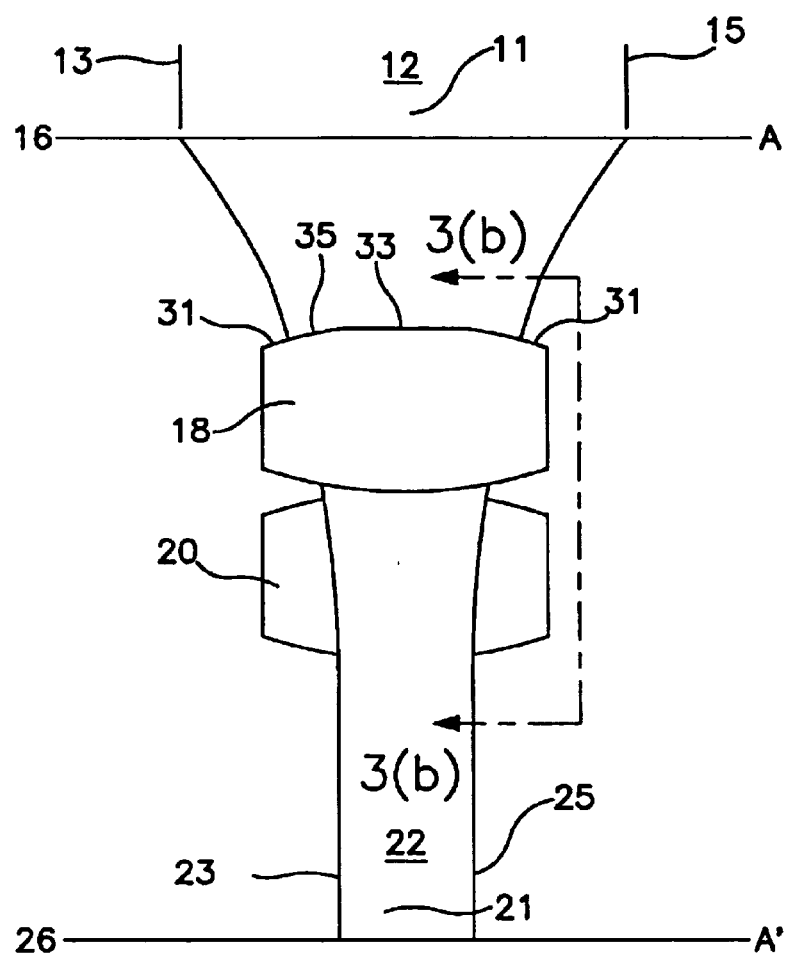
FIGS. 3(a) and 3(b) illustrate a necking process of the invention in which the necking force applied to the central region of the nonwoven web is selectively increased.
Figure 3B:
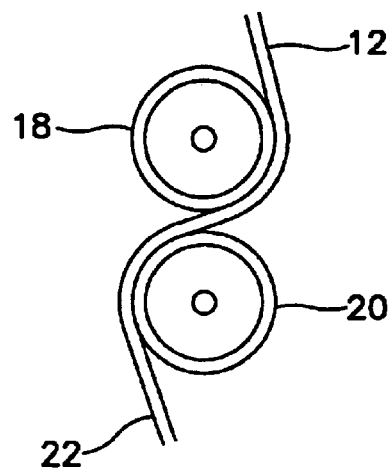

FIGS. 3(a) and 3(b) illustrate another embodiment of a necking process which can be used to selectively increase the necking of the central region 11 of the nonwoven web 12, relative to the two edge regions. The necking process of FIGS. 3(a) and 3(b) resembles the prior art necking process of FIG. 1, described above, except for the additional inclusion of an S-wrap assembly including rollers 18 and 20, in between the first nip 16 and second nip 26.

As shown in FIGS. 3(a) and 3(b), the nonwoven web follows an "S" path by passing partially around and underneath the roller 18, then between the rollers 18 and 20, then partially around and over the roller 20. Each of the rollers 18 and 20 has a profiled curved contact surface 35 including a central portion 33 and two end portions 31. The central portion 33 of each roller has a larger diameter than the end portions 31. The profiled contact surfaces 35 on the rollers 18 and 20 serve to increase the linear distance traveled by the central region of the nonwoven web relative to the two edge regions, between the first nip 16 and the second nip 26. The increased traveling distance causes the central region of the nonwoven web to experience increased tension and necking force relative to the two edge regions.

Whether the central region is made easier to neck by selective heating, or whether the necking force applied to the central region is selectively increased, the effect is to selectively increase the necking of the central region relative to the two edge regions. The process parameters can be selected and designed so that the selective increase in the necking of the central region is about equal to (and, in effect, offsets) the relatively greater amount of necking in the two edge regions that is inherent in a conventional necking process, such as the process illustrated in FIG. 1. One way to effectively select and design the process parameters is to determine which set of temperatures (in the process of FIG. 2), and/or which roller surface profile (in the process of FIGS. 3(a) and 3(b)) yields a necked nonwoven web 22 whose central region 21 has about the same basis weight as the two edge regions 23 and 25. The necked nonwoven web made according to the process of the invention should have an average basis weight in its central region (defined as the central 70% of the width of the necked nonwoven web) which is within about ±7% of the average basis weight of the two edge regions (defined as the outer 15% of the width on each side of the necked nonwoven web), when the starting nonwoven web is stretched to at least about 1.2 times, desirably to about 1.25 times its initial length in the machine direction to cause the necking. Suitably, the average basis weight of the central region should be within about ±5% of the average basis weight of the two edge regions. Desirably, the average basis weight of the central region should be within about ±3% of the average basis weight of the two edge regions. The necked nonwoven web should have a length which is about 1.05–1.7 times an initial (pre-necked) length, suitably about 1.1–1.5 times the initial length, desirably about 1.2–1.4 times the initial length.

Another test for uniformity of the necked nonwoven web is based on measurements of elongation at break in the cross direction, measured using ASTM D5034. Samples measuring three inches in the cross direction and one inch in the machine direction are cut inward beginning at both side edges of the necked nonwoven web. A similar sample is cut precisely from the center of the necked nonwoven web. Each of the samples is placed in an Instron tester so that one inch of sample is clamped within each of the jaws, leaving one inch of cross-directional width which can be stretched when the jaws are extended from each other.

Again, the necked nonwoven web should have a necked machine direction length which is at least about 1.2 times, desirably about 1.25 times its initial starting length. For the prior art nonwoven webs, there was substantial variation in cross-directional elongation at break between the central and edge samples. The edge samples, which experienced greater necking, had significantly higher cross directional elongation at break than the central sample. For purposes of the invention, both of the edge samples should have a cross-directional elongation at break which is not more than 20% higher, suitably not more than 10% higher, desirably not more than 5% higher, than the cross-directional elongation at break of the central sample. For purposes of this specification and the accompanying claims, this percentage difference between the cross-directional elongation at break of the central sample and the highest cross-directional elongation at break of the two edge samples is defined and referred to as "the cross-directional elongation at break nonuniformity index." Of course, the necked nonwoven web should have a necked width of at least about 9 inches, desirably at least about 15 inches, in order for this measurement to apply.

Notably, the process variables which effect a selective increase in necking are not limited to the precise boundaries of the central region of the nonwoven web. The selective heating and/or selective increase in necking tension, may be applied to an area which is wider or narrower than the central region so long as the central region, on average, is subjected to a selective increase in necking relative to the two edge regions, on average. Furthermore, the selective heating and/or selective increase in necking tension may be applied in a gradient fashion across the nonwoven web, so that the greatest impact is experienced in the central region.

The embodiment of FIGS. 2, 3(a) and 3(b) can be combined in various ways to yield a uniformly necked nonwoven web product. For instance, one or both heating devices 17, 19 in FIG. 2 can be positioned upstream of the rollers 18, 20 in FIG. 3(a). The rollers 18, 20 in FIG. 3(a) may be heated to facilitate the overall necking, effectively replacing the oven 29 in FIG. 2. Additionally, one or both nips 16 and 26 can include heated nip rollers. Heated rollers may be selectively heated according to a profile which yields higher temperatures in the central portion of the roller surfaces and relatively lower temperatures in the end portions of the roller surfaces.

The neckable material 12 may be formed by known nonwoven processes, such as, for example, meltblowing processes, spunbonding processes or bonded carded web processes and passed directly through the nip 16 without first being stored on a supply roll.

The neckable material 12 may be a nonwoven material such as, for example, spunbonded web, meltblown web or bonded carded web. If the neckable material 12 is a web of meltblown fibers, it may include meltblown microfibers. The neckable material 12 is made from any material that can be treated while necked so that, after treatment, upon application of a force to extend the necked material to its pre-necked dimensions, the material recovers generally to its necked dimensions upon termination of the force. A method of treatment is the application of heat. Certain polymers such as, for example, polyolefins, polyesters and polyamides may be heat treated under suitable conditions to impart such memory. Exemplary polyolefins include one or more of polyethylene, polypropylene, polybutene, ethylene copolymers, propylene copolymers and butene copolymers. Polypropylenes that have been useful include, for example, polypropylene available from the Himont Corporation under the trade designation PF-374, polypropylene available from the Exxon-Mobil Chemical Company under the trade designation Escorene® PD-3445, and polypropylene available from the Shell Chemical Company under the trade designation DX 5A09. Polyethylenes may also be used, including ASPUN® 6811A and 2553 linear low density polyethylenes from the Dow Chemical Company, as well as various high density polyethylenes. Chemical characteristics of these materials are available from their respective manufacturers.

In one embodiment of the present invention, the neckable material 12 is a multilayer material having, for example, at least one layer of spunbonded web joined to at least one layer of meltblown web, bonded carded web or other suitable material. For example, the neckable material 12 may be a multilayer material having a first layer of spunbonded polypropylene having a basis weight from about 0.2 to about 8 ounces per square yard (osy), a layer of meltblown polypropylene having a basis weight from about 0.1 to about 4 osy, and a second layer of spunbonded polypropylene having a basis weight of about 0.2 to about 8 osy.

Alternatively, the neckable material 12 may be single layer of material such as, for example, a spunbonded web having a basis weight of from about 0.2 to about 10 osy or a meltblown web having a basis weight of from about 0.2 to about 8 osy.

The neckable material 12 may also be a composite material made of a mixture of two or more different fibers or a mixture of fibers and particulates. Such mixtures may be formed by adding fibers and/or particulates to a gas stream in which meltblown fibers are carried so that an intimate entangled commingling of meltblown fibers and other materials, e.g., wood pulp, staple fibers or particulates such as, for example, superabsorbent materials occurs prior to collection of the fibers upon a collecting device to form a coherent web of randomly dispersed meltblown fibers and other materials such as disclosed in U.S. Pat. No. 4,100,324, the disclosure of which is hereby incorporated by reference.

If the neckable material 12 is a nonwoven web of fibers, the fibers should be joined by interfiber bonding using one or more of the bonding processes described in the foregoing "DEFINITION" of interfiber bonding.

The relation between the original width of the neckable material 12 to its width after tensioning determines the stretch limits of the reversibly necked material 22. For example, with reference to FIG. 2, if it is desired to prepare a reversibly necked material that can be stretched to a 150 percent elongation (i.e., 250 percent of its necked width) and can recover to within about 25 percent of its neckable width, a neckable material having a width "A" such as, for example, 250 cm, is tensioned so that it necks down to a width A' of about 100 cm for a percent neck or percent neckdown of about 60 percent. While tensioned, it is heat treated to maintain its reversibly necked configuration 22. The resulting reversibly necked material has a width A' of about 100 cm and is stretchable to at least the original 250 cm dimension "A" of the neckable material for an elongation or percent stretch of about 150 percent. The reversibly necked material may return to within about 25 percent of its necked width of about 100 cm, (i.e., to a width of about 125 cm) after release of the stretching force for a recovery of about 83 percent.

The claims of the present invention are meant to encompass uniformly necked materials (and processes of making them) which are adapted to stretch at least 75 percent and recover at least 50 percent when stretched by 75 percent.

Figure 4:
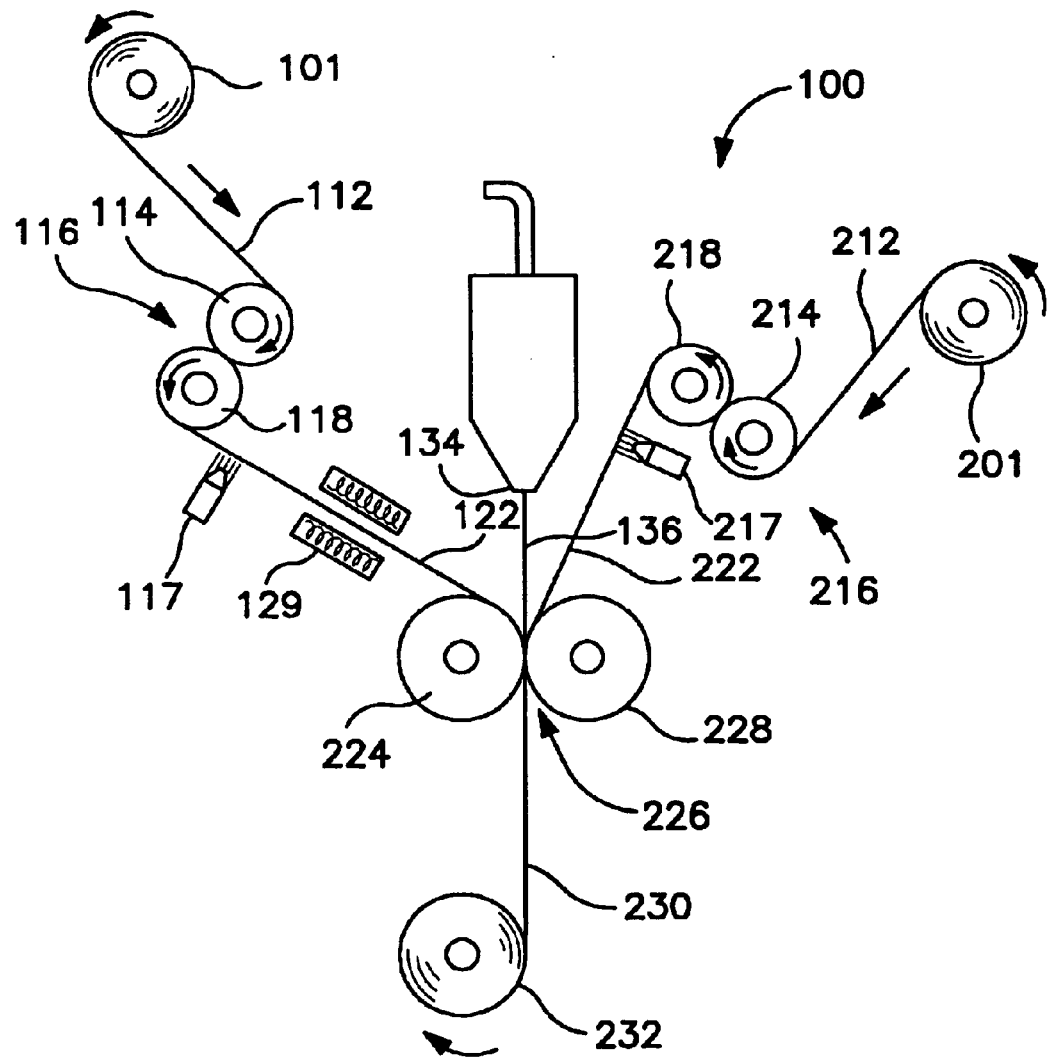
FIGS. 4 and 5 illustrate processes for forming neck-bonded laminates according to the invention.

FIG. 4 schematically illustrates a process 100 for preparing a neck-bonded laminate of the invention, including two necked spunbonded webs and an elastomeric film between them. In this process, the elastomeric film is extruded between the two necked spunbond webs. The central regions of the spunbond webs are selectively heated to enhance the necking in those regions.

Referring to FIG. 4, first and second spunbond webs 112 and 212 are unwound from supply rolls 101 and 201. First spunbond web 112 passes through a first nip 116, including nip rollers 114 and 118, turning at a first surface velocity; and through a second nip 226, including nip rollers 224 and 228, turning at a second surface velocity which is higher than the first surface velocity. Necking of the spunbond web between the first nip 116 and second nip 226 is effected by the different surface velocities, and with the aid of oven 129 and selective heating device 117. The oven 129 heats the entire nonwoven web to a temperature about 20–60° C. below the melting temperature of the spunbond fibers. Selective heating device 117, which can be a hot air knife, selectively heats the central region of the spunbond web upstream from the oven 129. Heating device 117 selectively increases the necking in the central region by causing the central region of the nonwoven web 112 to be heated over a greater distance than the edge regions of the web. Heating device 117 selectively applies heat to the central region, at about 20–60° C. below the melting temperature of the spunbond fibers. As explained above, the area affected by heating device 117 may be wider or narrower than the boundaries of the central region provided that the central region, on average, is exposed to greater heating and/or is heated for a longer period of time than the two edge regions, on average.

Alternatively, or additionally, the edge regions of the nonwoven web 112 may be selectively chilled using chill rollers (not shown), thereby increasing the necking tension in the edge regions of the nonwoven web relative to the central region.

Second spunbond web 212 passes through a third nip 216 which includes nip rollers 214 and 218, turning at a third surface velocity; and through the above-described second nip 226, including nip rollers 224 and 228, turning at the second surface velocity. The second surface velocity is higher than the third surface velocity, thereby effecting necking between the nips 216 and 226. As illustrated, the entire nonwoven web 212 is not heated using an oven. Instead, a selective heating device 217, which can be a hot air knife, is used to selectively heat the central region of the nonwoven web 212. Heating device 217 selectively increases the necking in the central region of nonwoven web 212, sufficiently to offset the increased necking in the edge regions that would inherently result from a conventional necking process. Heating device 217 applies heat selectively to the central region, at about 20–60° C. below the melting point of the spunbond fibers. Again, the area affected by the heating device 217 may be wider or narrower than the precise boundaries of the central region provided that the central region, on average, is heated to a greater extent than the two edge regions. Again, the edge regions of nonwoven web 212 may be selectively chilled using chill rollers (not shown) to selectively retard the necking in the edge regions.

To make the neck bonded laminate, a molten elastomer is extruded through a die tip 134 to form an extruded elastomeric film 136. The extruded elastomeric film 136 is deposited directly between the tensioned necked spunbond webs 122 and 222, and all three layers are brought together in the nip 226. The extruded elastomeric film 136 may contact the necked materials 122 and 222 within about 0.1–1.0 second after the film leaves the die tip 134, suitably within about 0.25–0.5 seconds, desirably within about 0.3–0.45 seconds.

The film of elastomer may be extruded at a temperature of from about 180–300° C., suitably of about 200–250° C.

Light pressure is applied in the nip 26 to thermally bond the elastomeric film 136 (in a relatively untensioned state) to the tensioned necked, nonwoven webs 212 and 222. The nip rollers 224 and 228 may or may not be patterned, need not be heated, and may be chilled (e.g., to a temperature of about 10–30° C.) so as to quench the elastomeric film between the necked spunbond webs. The resulting neck-bonded laminate 230 can be stretched in the cross direction due to the extendibility of the necked nonwoven webs. Upon relaxation, the laminate 230 will return substantially to its original manufactured configuration due to the retractive influence of the elastomeric film. Further details pertaining to the manufacture of neck-bonded laminates using a molten elastic film are provided in U.S. Pat. No. 5,514,470 to Haffner et al., which is incorporated by reference.

Figure 5:
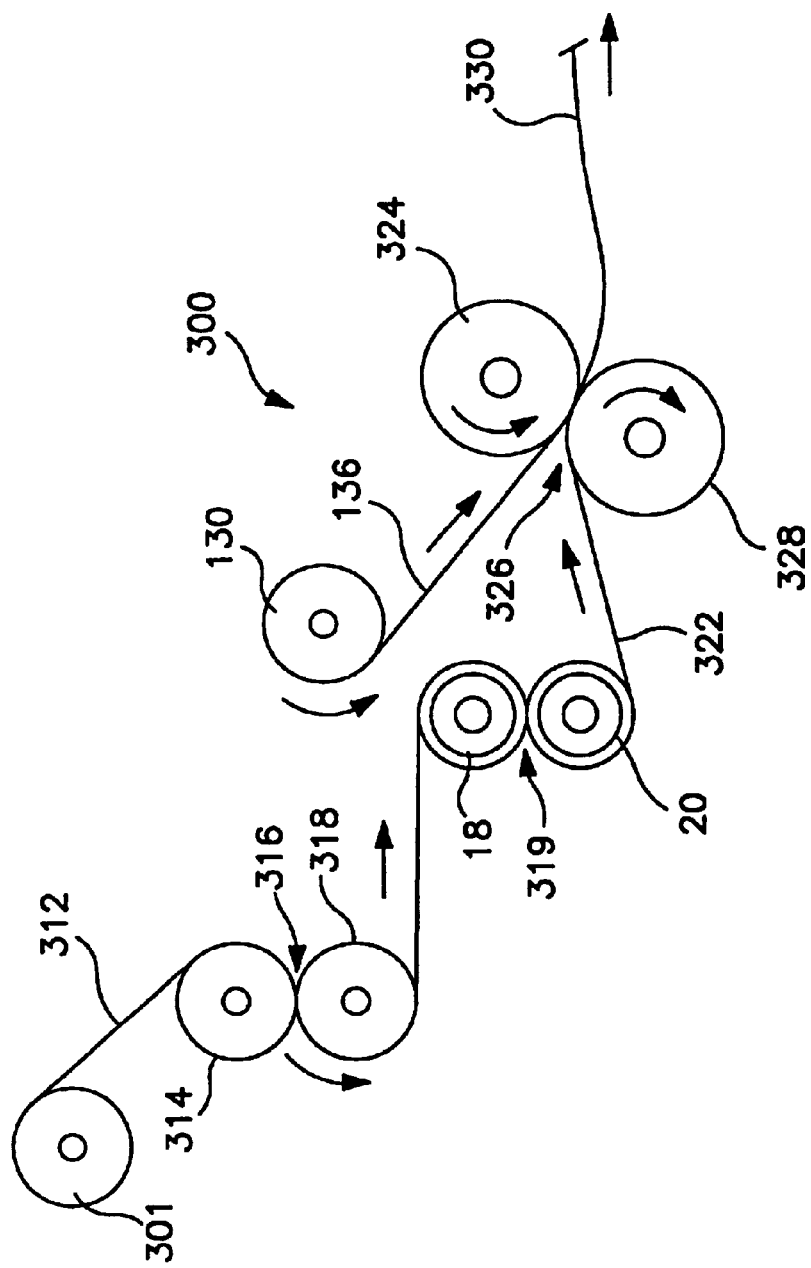

FIG. 5 illustrates an alternative process 300 for making a neck-bonded laminate of the invention. In this process, a pre-formed extendible or elastic film is combined with a necked nonwoven web. An extendible film is one which can be stretched like an elastic film, but does not necessarily retract. The central region of the nonwoven web is exposed to a selectively higher necking tension or force, by selectively increasing the distance traveled by the central region between first and second nips.

Referring to FIG. 5, nonwoven web 12 (for example, a spunbond-meltblown spunbond laminate) is unwound from supply roll 301. Nonwoven web 12 is passed through a first nip 316, including nip rollers 314 and 318 turning at a first surface velocity; and a second nip 326, including nip rollers 324 and 328 turning at a second surface velocity which is higher than the first surface velocity. An S-roll system 319, including rollers 18 and 20 as illustrated in FIGS. 3(a) and 3(b), is placed between the first nip 316 and second nip 326. As shown in FIG. 3(a), rollers 18 and 20 have profiled surfaces resulting in a larger diameter in the central portion than at the end portions. By passing nonwoven web 312 over rollers 18 and 20, the central region of the nonwoven web travels a greater linear distance, and is exposed to a selectively higher necking force, than the edge regions. This causes selectively greater necking of the central region, sufficient to offset the higher necking in the edge regions that results from a conventional necking process.

An extendible or elastomeric film 136 is unwound from a supply roll 130 and is combined, in a substantially untensioned state, with the tensioned, necked nonwoven web 322 by passing both materials through the second nip 326. One or both of the rollers 324 and 328 may be heated using techniques well known in the art, to effect thermal bonding between the extendible or elastic film and the necked nonwoven web. Further details of a process for joining a pre-fabricated film to a necked nonwoven web are provided in U.S. Pat. No. 5,883,028 to Morman et al., which is incorporated by reference. The resulting neck-bonded laminate 330 has cross-directional extendibility due to the extendibility of the necked nonwoven web. When the extension force is removed, the laminate 330 will return substantially to its manufactured configuration if the film is elastic. If the film is merely extendible but not elastic, the laminate will not significantly recover.

The film 136 (FIG. 4 or 5) may be made from any material which may be manufactured in sheet form. Generally, any suitable extendible or elastomeric film forming resins or blends containing the same may be utilized for the film.

For example, the film 136 may be made from elastic block copolymers having the general formula A—B—A' where A and A' are each a thermoplastic polymer end block which contains a styrenic moiety such as a poly (vinyl arene) and where B is an elastomeric polymer midblock such as a conjugated diene or a lower alkene polymer. The film 136 may be formed from, for example, (polystyrene/poly (ethylenebutylene)/polystyrene) block copolymers available from the Shell Chemical Company under the trademark KRATON G. One such block copolymer may be, for example, KRATON G-1657.

Other exemplary elastomeric materials which may be used to include polyurethane elastomeric materials such as, for example, those available under the trademark ESTANE from B. F. Goodrich & Co., polyamide elastomeric materials such as, for example, those available from the trademark PEBAX from the Rilsan Company, and polyester elastomeric materials such as, for example, those available under the trade designation Hytrel from E. I. DuPont De Nemours & Company. Formation of elastic sheets from polyester elastic materials is disclosed in, for example, Morman et al. U.S. Pat. No. 4,741,949, hereby incorporated by reference.

A polyolefin may be used alone to make an extendible film, or may be blended with the elastomeric polymer to improve the processability of the film composition. The polyolefin must be one which, when subjected to an appropriate combination of elevated pressure and elevated temperature conditions, is extrudable, alone or in blended form. Useful polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothaene NA601 (also referred to herein as PE NA601 or polyethylene NA601). Two or more of the polyolefins may be utilized. Extrudable blends of elastomeric polymers and polyolefins are disclosed in, for example, Wisneski et al. U.S. Pat. No. 4,663,220, hereby incorporated by reference.

The film 136 may also be a pressure sensitive elastomer adhesive sheet. For example, the elastic material itself may be tacky or, alternatively, a compatible tackifying resin may be added to the extrudable elastomeric compositions described above to provide an elastomeric sheet that can act as a pressure sensitive adhesive, e.g., to bond the elastomeric sheet to a tensioned, necked nonelastic web. In regard to the tackifying resins and tackified extrudable elastomeric compositions, note the resins and compositions as described in J. S. Keiffer and T. J. Wisneski U.S. Pat. No. 4,789,699, filed Oct. 15, 1986 for "Ambient Temperature Bondable Elastomeric Nonwoven Web", the disclosure of which is hereby incorporated by reference.

Any tackifier resin can be used which is compatible with the elastomeric polymer and can withstand the high processing (e.g., extrusion) temperatures. If blending materials such as, for example, polyolefins or extending oils are used, the tackifier resin should also be compatible with those blending materials. Generally, hydrogenated hydrocarbon resins are preferred tackifying resins, because of their better temperature stability. REGALREZ™ and ARKON™ P series tackifiers are examples of hydrogenated hydrocarbon resins. ZONATAKT™501 lite is an example of a terpene hydrocarbon. REGALREZ hydrocarbon resins are available from Hercules Incorporated. ARKON P series resins are available from Arakawa Chemical (U.S.A.) Incorporated. Of course, the present invention is not limited to use of such three tackifying resins, and other tackifying resins which are compatible with the other components of the composition and can withstand the high processing temperatures, can also be used.

A pressure sensitive elastomer adhesive may include, for example, from about 40 to about 80 percent by weight elastomeric polymer, from about 5 to about 40 percent polyolefin and from about 5 to about 40 percent resin tackifier. For example, a particularly useful composition included, by weight, about 61 to about 65 percent KRATON G-1657, about 17 to about 23 percent Polyethylene NA-601, and about 15 to about 20 percent REGALREZ 1126.

The film 136 may also be a multilayer material in that it may include two or more individual coherent film layers. If the film is elastic, it may be stretched in the machine direction before being bonded to the necked nonwoven web 322, to form a laminate which is elastic in both the machine direction and the cross direction. A similar laminate is disclosed in U.S. Pat. No. 5,116,662, which is incorporated by reference.

The laminates of the invention have improved basis weight uniformity due to the improved uniformity of the necked nonwoven web components. When the necked nonwoven webs are stretched to at least about 1.2 times, desirably about 1.25 times their initial machine direction length to cause necking, a laminate of the invention should have an average basis weight in its central region (defined as the central 70% of the width of the laminate) which is within about ±7% of the average basis weight of the two edge regions (defined as the outer 15% of the width on each side of the laminate). Suitably, the average basis weight of the central region should be within about ±5% of the average basis weight of the two edge regions. Desirably, the average basis weight of the central region should be within about ±3% of the average basis weight of the two edge regions.

While the embodiments of the invention disclosed herein are presently preferred, various modifications and improvements can be made without departing from the invention. The scope of the invention is indicated in the appended claims, and all changes that fall within the meaning and range of equivalents are intended to be embraced therein.

We claim:

1. A process for making a necked nonwoven material having improved cross-directional uniformity, comprising the steps of:
   providing a nonwoven web having a central region and two edge regions;
   passing the nonwoven web through a first nip having a first average surface velocity, and a second nip having a second average surface velocity higher than the first average surface velocity;
   necking the nonwoven web between the first and second nips; and
   selectively increasing the necking in the central region of the nonwoven web relative to the two edge regions;
   wherein the step of selectively increasing the necking in the central region comprises the step of reducing necking resistance in the central region relative to the two edge regions.

2. The process of claim 1, wherein the step of reducing necking resistance in the central region comprises the step of selectively heating the central region.

3. The process of claim 2, wherein the step of selectively heating the central region comprises the step of applying a hot air knife to the central region.

4. The process of claim 1, further comprising the step of heating the entire nonwoven web between the first and second nips.

5. The process of claim 1, wherein the second average surface velocity is about 1.05–1.7 times the first average surface velocity.

6. The process of claim 1, wherein the second average surface velocity is about 1.1–1.5 times the first average surface velocity.

7. The process of claim 1, wherein the second average surface velocity is about 1.2–1.4 times the first average surface velocity.

8. The process of claim 1, wherein the necked nonwoven material has a length which is at least 1.2 times an initial pre-necked length.

9. The process of claim 1, further comprising the step of combining the necked nonwoven web with an elastomeric or extendible film.

10. A process for making a necked nonwoven material having improved cross-directional uniformity, comprising the steps of:
    providing a nonwoven web having a central region and two edge regions;
    passing the nonwoven web through a first nip having a first average surface velocity, and a second nip having a second average surface velocity at least 1.2 times the first average surface velocity;
    necking the nonwoven web between the first and second nips; and
    selectively increasing the necking in the central region relative to the two edge regions, to form a necked nonwoven material having an average basis weight in the central region within about ±7% of an average basis weight in the two edge regions;
    wherein the step of selectively increasing the necking in the central region comprises the step of reducing necking resistance in the central region relative to the two edge regions.

11. The process of claim 10, wherein the necked nonwoven web has an average basis weight in the central region within about ±5% of the average basis weight in the two edge regions.

12. The process of claim 10, wherein the necked nonwoven web has an average basis weight in the central region within about ±3% of the average basis weight in the two edge regions.

13. The process of claim 10, wherein the nonwoven web comprises a spunbond web.

14. The process of claim 10, wherein the nonwoven web comprises a meltblown web.

15. The process of claim 10, wherein the nonwoven web comprises a spunbond-meltblown-spunbond laminate.

16. The process of claim 10, further comprising the step of combining the necked nonwoven web with an elastomeric of extendible film.

17. A process for making a necked nonwoven material having improved cross-directional uniformity, comprising the steps of:
    providing a nonwoven web having a central region and two edge regions;
    passing the nonwoven web through a first nip having a first average surface velocity and a second nip having a second average surface velocity about 1.1–1.5 times the first average surface velocity;
    necking the nonwoven web between the first and second nips; and
    selectively increasing the necking in the central region relative to the two edge regions, to form a necked nonwoven material having an average basis weight in the central region within about ±3% of an average basis weight in the two edge regions;
    wherein the step of selectively increasing the necking in the central region comprises the step of reducing necking resistance in the central region relative to the two edge regions.

18. The process of claim 17, wherein the nonwoven web comprises a spunbond web.

19. The process of claim 17, wherein the nonwoven web comprises a meltblown web.

20. The process of claim 17, wherein the nonwoven web comprises a spunbond-meltblown-spunbond laminate.

21. The process of claim 17, further comprising the step of combining the necked nonwoven web with an elastomeric or extendible web.

22. A process for making a necked nonwoven material having improved cross-directional uniformity, comprising the steps of:
    providing a nonwoven web having a central region and two edge regions;
    passing the nonwoven web through a first nip having a first average surface velocity, and a second nip having a second average surface velocity higher than the first average surface velocity;
    necking the nonwoven web between the first and second nips; and
    selectively increasing the necking in the central region of the nonwoven web relative to the two edge regions;
    wherein the step of selectively increasing the necking in the central region comprises the step of increasing necking force in the central region relative to the two edge regions.

23. The process of claim 22, wherein the step of increasing necking force in the central region comprises the step of selectively increasing a distance traveled by the central region between the first and second nips, relative to a distance traveled by the two edge regions.

24. The process of claim 23, wherein the step of selectively increasing the distance traveled by the central region comprises the step of passing the nonwoven web over a guide roller having a profiled outer surface.

25. The process of claim 24, wherein the nonwoven web is passed over two guide rollers, each having a profiled outer surface.

26. The process of claim 22, further comprising the step of heating the entire nonwoven web between the first and second nips.

27. The process of claim 22, wherein the second average surface velocity is about 1.05–1.7 times the first average surface velocity.

28. The process of claim 22, wherein the second average surface velocity is about 1.1–1.5 times the first average surface velocity.

29. The process of claim 22, wherein the second average surface velocity is about 1.2–1.4 times the first average surface velocity.

30. The process of claim 22, wherein the necked nonwoven material has a length which is at least 1.2 times an initial pre-necked length.

31. The process of claim 22, further comprising the step of combining the necked nonwoven web with an elastomeric or extendible film.

32. A process for making a necked nonwoven material having improved cross-directional uniformity, comprising the steps of:
providing a nonwoven web having a central region and two edge regions;
passing the nonwoven web through a first nip having a first average surface velocity, and a second nip having a second average surface velocity at least 1.2 times the first average surface velocity;
necking the nonwoven web between the first and second nips; and
selectively increasing the necking in the central region relative to the two edge regions, to form a necked nonwoven material having an average basis weight in the central region within about ±7% of an average basis weight in the two edge regions;
wherein the step of selectively increasing the necking in the central region comprises the step of increasing necking force in the central region relative to the two edge regions.

33. The process of claim 32, wherein the necked nonwoven web has an average basis weight in the central region within about ±5% of the average basis weight in the two edge regions.

34. The process of claim 32, wherein the necked nonwoven web has an average basis weight in the central region within about ±3% of the average basis weight in the two edge regions.

35. The process of claim 32, wherein the nonwoven web comprises a spunbond web.

36. The process of claim 32, wherein the nonwoven web comprises a meltblown web.

37. The process of claim 32, wherein the nonwoven web comprises a spunbond-meltblown-spunbond laminate.

38. The process of claim 32, further comprising the step of combining the necked nonwoven web with an elastomeric or extendible film.

39. A process for making a necked nonwoven material having improved cross-directional uniformity, comprising the steps of:
providing a nonwoven web having a central region and two edge regions;
passing the nonwoven web through a first nip having a first average surface velocity and a second nip having a second average surface velocity about 1.1–1.5 times the first average surface velocity;
necking the nonwoven web between the first and second nips; and
selectively increasing the necking in the central region relative to the two edge regions, to form a necked nonwoven material having an average basis weight in the central region within about ±3% of an average basis weight in the two edge regions;
wherein the step of selectively increasing the necking in the central region comprises the step of increasing necking force in the central region relative to the two edge regions.

40. The process of claim 39, wherein the nonwoven web comprises a spunbond web.

41. The process of claim 39, wherein the nonwoven web comprises a meltblown web.

42. The process of claim 39, wherein the nonwoven web comprises a spunbond-meltblown-spunbond laminate.

43. The process of claim 39, further comprising the step of combining the necked nonwoven web with an elastomeric or extendible web.

44. A process for making a necked nonwoven material having improved cross-directional uniformity, comprising the steps of:
providing a nonwoven web having a central region and two edge regions;
passing the nonwoven web through a first nip having a first average surface velocity, and a second nip having a second average surface velocity higher than the first average surface velocity;
necking the nonwoven web between the first and second nips; and
selectively decreasing the necking in the two edge regions of the nonwoven web relative to the central region;
wherein the step of selectively decreasing the necking in the two edge regions comprises the step of selectively chilling the two edge regions.

45. The process of claim 44, further comprising the step of heating the entire nonwoven web between the first and second nips.

46. The process of claim 44, wherein the second average surface velocity is about 1.05–1.7 times the first average surface velocity.

47. The process of claim 44, wherein the second average surface velocity is about 1.1–1.5 times the first average surface velocity.

48. The process of claim 44, wherein the second average surface velocity is about 1.2–1.4 times the first average surface velocity.

49. The process of claim 44, wherein the necked nonwoven material has a length which is at least 1.2 times an initial pre-necked length.

50. The process of claim 55, further comprising the step of combining the necked nonwoven web with an elastomeric or extendible film.

51. A process for making a necked nonwoven material having improved cross-directional uniformity, comprising the steps of:
providing a nonwoven web having a central region and two edge regions;

passing the nonwoven web through a first nip having a first average surface velocity, and a second nip having a second average surface velocity at least 1.2 times the first average surface velocity;

necking the nonwoven web between the first and second nips; and selectively decreasing the necking in the two edge regions of the nonwoven web relative to the central region, to form a necked nonwoven material having an average basis weight in the central region within about ±7% of an average basis weight in the two edge regions;

wherein the step of selectively decreasing the necking in the two edge regions comprises the step of selectively chilling the two edge regions.

52. The process of claim 51, wherein the necked nonwoven web has an average basis weight in the central region within about ±5% of the average basis weight in the two edge regions.

53. The process of claim 51, wherein the necked nonwoven web has an average basis weight in the central region within about ±3% of the average basis weight in the two edge regions.

54. The process of claim 51, wherein the nonwoven web comprises a spunbond web.

55. The process of claim 51, wherein the nonwoven web comprises a meltblown web.

56. The process of claim 51, wherein the nonwoven web comprises a spunbond-meltblown-spunbond laminate.

57. The process of claim 51, further comprising the step of combining the necked nonwoven web with an elastomeric or extendible film.

58. A process for making a necked nonwoven material having improved cross-directional uniformity, comprising the steps of:

providing a nonwoven web having a central region and two edge regions;

passing the nonwoven web through a first nip having a first average surface velocity and a second nip having a second average surface velocity about 1.1–1.5 times the first average surface velocity;

necking the nonwoven web between the first and second nips; and selectively decreasing the necking in the two edge regions of the nonwoven web relative to the central region, to form a necked nonwoven material having an average basis weight in the central region within about ±3% of an average basis weight in the two edge regions;

wherein the step of selectively decreasing the necking in the two edge regions comprises the step of selectively chilling the two edge regions.

59. The process of claim 58, wherein the nonwoven web comprises a spunbond web.

60. The process of claim 58, wherein the nonwoven web comprises a meltblown web.

61. The process of claim 58, wherein the nonwoven web comprises a spunbond-meltblown-spunbond laminate.

62. The process of claim 58, further comprising the step of combining the necked nonwoven web with an elastomeric or extendible web.

* * * * *